June 2, 1964 R. J. BECK 3,135,497
NUT AND SCREW MECHANISM
Filed Feb. 26, 1963 2 Sheets-Sheet 1
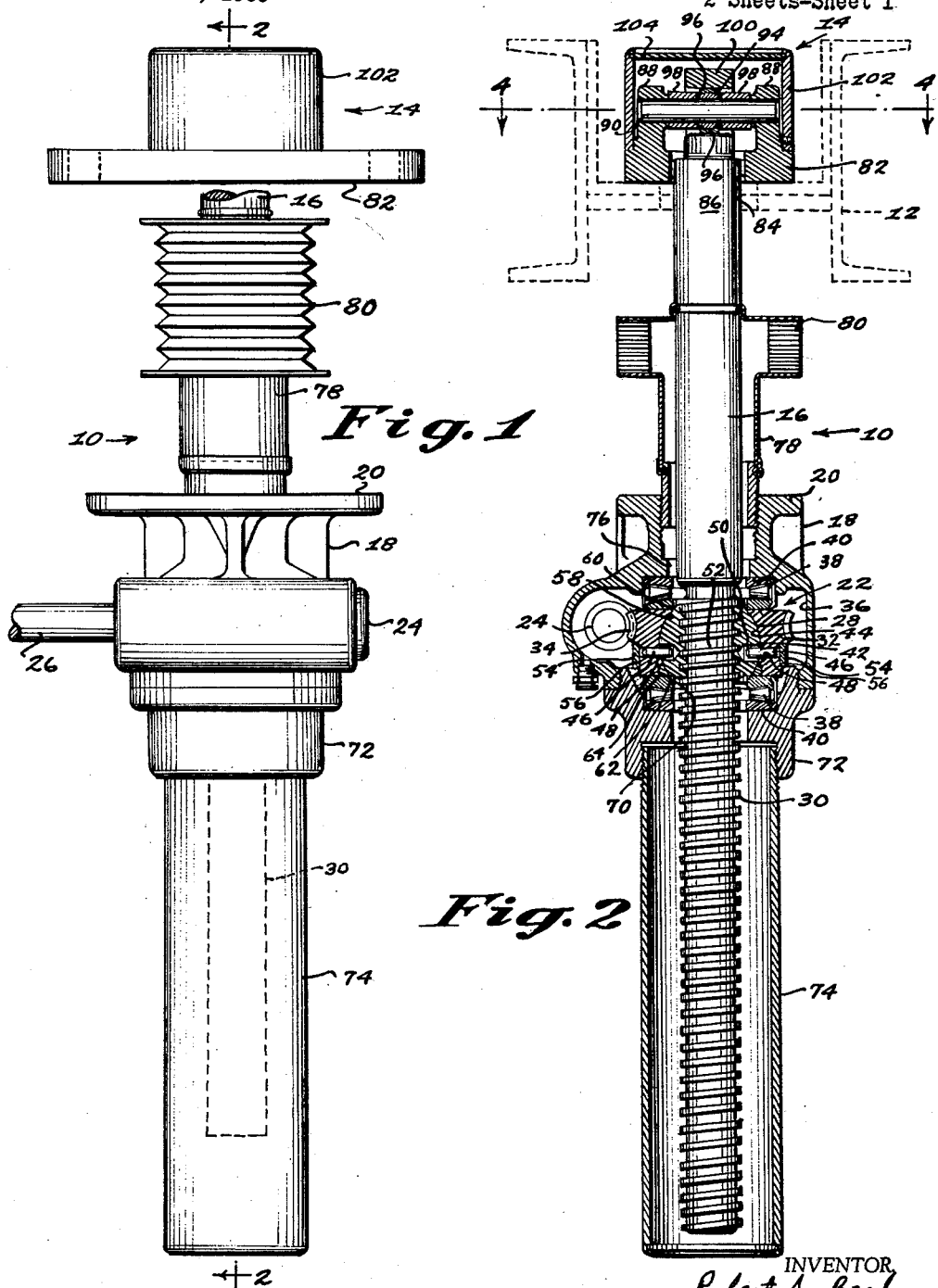
INVENTOR,
Robert J. Beck
BY
ATTORNEY June 2, 1964    R. J. BECK    3,135,497
NUT AND SCREW MECHANISM
Filed Feb. 26, 1963    2 Sheets-Sheet 2

INVENTOR.
Robert J. Beck
BY Channing L. Richards
+ Dalbert U. Shefte
ATTORNEY

United States Patent Office 3,135,497
Patented June 2, 1964

3,135,497
NUT AND SCREW MECHANISM
Robert J. Beck, Charlotte, N.C., assignor to Duff-Norton Company, Charlotte, N.C., a corporation of North Carolina
Filed Feb. 26, 1963, Ser. No. 261,095
6 Claims. (Cl. 254—103)

The present invention relates to a nut and screw mechanism for converting rotary motion into lineal motion wherein the nut is compositely formed to accommodate relative angular displacement of the screw with respect to one of the nut components such that the operation of the mechanism will not be hampered by transverse load displacements. More particularly the present invention is directed to a nut and screw mechanism wherein such angular displacement is accomplished by a composite nut structure independently of the driving relation of the nut on the screw, and without requiring additional bearing or other housing structure for either the nut or screw. Thus, a compact and efficient mechanism is provided that functions to realign itself to load displacements, and thereby avoid straining of the elements and freezing of the nut on the screw when load displacements are experienced. In addition, the structure of the present invention may be readily installed for operation without requiring precise alignment, as any misalignment is inherently accommodated by the mechanism itself.

Briefly described, the nut and screw mechanism of the present invention is formed with a composite nut having an inner annular component that is threadably mounted on the screw for effecting lineal movement upon rotation of the nut, and an outer annular component surrounding the inner component and having a concave inwardly facing surface that mates with a convex outwardly facing surface of the inner component so that one component can be displaced angularly with respect to the other component. These components are drivingly connected for simultaneous rotation by key means extending therebetween. Thus, the mechanism can be operated by rotating the outer component, which causes, through the key means, rotation of the inner component on the screw, while relative angular displacement of the screw and outer component are accommodated by the convex and concave mating surfaces. With this construction no special mounting of either the nut or screw is necessary and therefore the functioning of the mechanism is not restricted in any way by the provision for angular displacement. Also, as the nut components rotate together the mating convex and concave surfaces rotate together so that no additional drag or frictional restraint results from the angular displacement construction of the present invention.

In the preferred embodiment of the present invention the nut and screw mechanism is incorporated in a jack mechanism with the outer component of the nut being mounted in a housing member and with the mating concave and convex surfaces being frusto-spherical so that relative spherical displacement of the jack screw with respect to the housing is provided to accommodate displacement of loads due to misalignment or shifting of either the loads or the jack mechanism. The mounting of the outer component in the housing member maintains the outer component in proper operating relation to driving means, such as gearing, that is also mounted on the housing member, so that efficient operation of the jack mechanism is not effected by spherical displacements.

Even greater flexibility in accommodating load displacements may be obtained, particularly where the jack mechanism is employed to suspend loads from an overhead support, by pivotally mounting the jack screw on a mounting member for support of loads by this mounting member and the aforementioned housing member through the intermediate jack screw. This not only permits relative displacement of the jack screw with respect to both the mounting member and housing member, but also permits transverse displacement of loads while maintaining the housing member and mounting member in parallel relation.

This mounting member may include a transverse shaft carrying a ball bushing to which an end of the jack screw is attached, with the transverse shaft and ball bushing permitting universal pivoting of the jack screw, and the transverse shaft preventing rotation of the jack screw such that no additional key means are necessary in the jack mechanism to restrain the jack screw against rotation.

Other and further features and advantages of the present invention will be apparent from the following description and accompanying drawings, in which:

FIG. 1 is a side elevational view of a worm gear jack according to the preferred embodiment of the present invention, showing the elements in an intermediate position and the jack screw partially broken away;

FIG. 2 is a vertical sectional view of the jack of FIG. 1 in raised position and as viewed along line 2—2 of FIG. 1;

Figure 3:
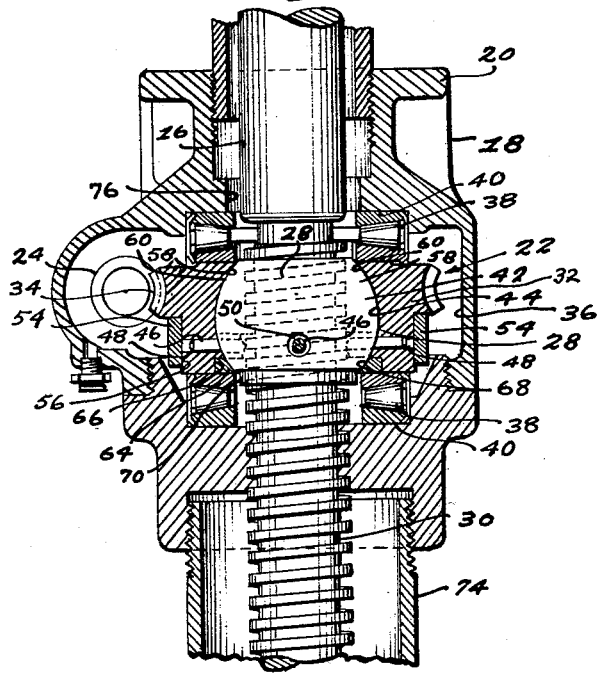
FIG. 3 is an enlargement of a portion of FIG. 2 showing the inner nut component without sectioning.
Figure 4:
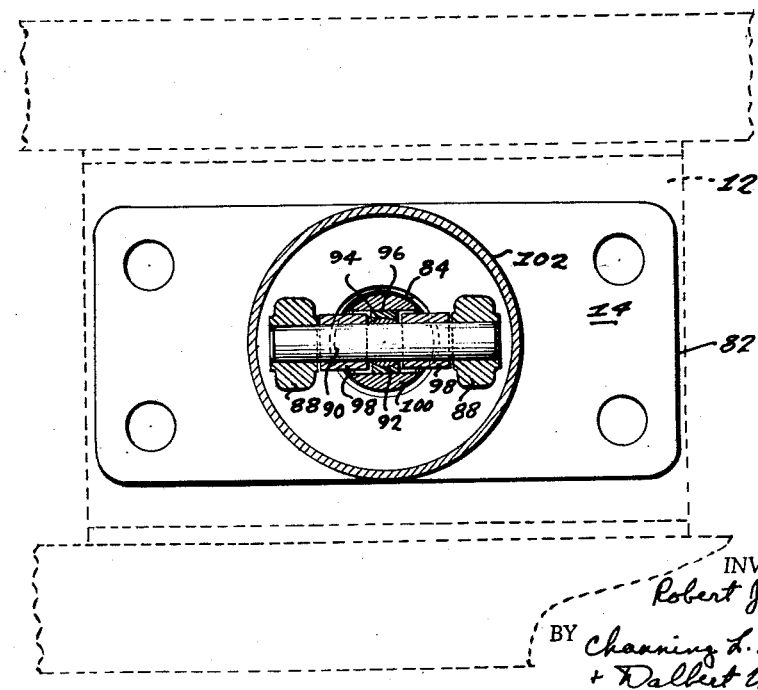
FIG. 4 is a horizontal sectional view taken along line 4—4 of FIG. 2.

Referring now to the drawings in detail the present invention is shown for purposes of illustration only as incorporated in a worm gear jack 10 utilized to support loads from an overhead support 12. Basically, the jack 10 consists of a mounting member 14 supported on the overhead support, a jack screw 16 dependingly supported from the mounting member, and a housing member 18 slidably mounted on the jack screw for support of loads on a load bearing surface 20 thereof in spaced relation below the overhead support 12. This housing member 18 contains therewithin the composite operating nut 22, and the driving worm 24 of the worm shaft 26 that extends outwardly from the housing member 18 for driving connection to a drive motor (not shown) or other conventional means.

The composite operating nut 22 is formed from two interconnected components, an inner nut component 28 threadably mounted on the threaded portion 30 of the jack screw 16, and an outer gear component 32 having a worm gear outer surface 34 in meshing engagement with the driving worm 24. These components, 28 and 32, are contained within a cavity 36 in the housing member 18, with the outer gear component 32 retained between a pair of spaced annular bearings 38 that are seated in annular bearing seats 40 of the housing member cavity 36 so that the outer gear component 32 is free to rotate within the housing member 18 while being retained in fixed meshing relation with respect to the driving worm 24.

The components 28 and 32 of the composite operating nut 22 are connected for transmitting driving rotation from the outer gear component 32 to the inner nut component 28, and are constructed to permit angular displacement of one component with respect to the other for accommodating relative angular displacement of the jack screw 16 with respect to the housing member 18 without disrupting the operating relationship of the elements.

To accomplish this relative angular displacement, the inner nut component 28 is formed with a convex outer surface 42, and the outer gear component 32 is formed with a concave inner surface 44 that mates with the convex surface 42 of the inner nut component. In the embodiment illustrated these convex and concave surfaces are frusto-spherical so that universal swivel action is possible between the components.

The aforementioned driving connection of the components 28 and 32 is provided by four key pins 46 mounted in four key pin receiving holes 48 extending radially through the outer gear component 32 below the worm gear surface 34 at 90° intervals. These key pins 46 are longer than the holes 48 and extend inwardly beyond the frusto-spherical inner surface 44 of the outer gear component 32 into keyway recesses 50 formed in the frusto-spherical outer surface 42 of the inner nut component 28 in alignment with the key pins 46. Thus rotation of the outer gear component 32 is transmitted by the key pins 46 to the inner nut component 28 to effect simultaneous rotation of the components.

The keyway recesses 50 are enlarged with respect to the key pins 46 transversely of the direction of rotation to permit shifting of the key pins therein during angular displacement of the components of the operating nut 22. In the embodiment illustrated the keyway recesses 50 are cylindrical and therefore are enlarged also in the direction of rotation, which is necessary to permit the pins 46 to move in the recesses 50 to accommodate universal displacement, particularly where, as illustrated, the key pins 46 and recesses 50 are offset below the projected center 52 about which the frusto-spherical surfaces pivot.

The key pins 46 are retained in component connecting position by a retaining ring 54 seated on a cylindrical surface 56 of the outer gear component 32 in covering relation over the key pin receiving holes 48. This retaining ring construction facilitates assembly as the key pins 46 can be inserted after the composite nut components are assembled and the retaining ring 54 subsequently seated over the key pin holes 48. Also, by retaining the key pins 46 with the retaining ring 54 the pins may be loosely fitted in the holes 48 and can rotate freely during operation to roll with component displacements and thereby reduce the concentration of wear at any one point on the key pins.

Although the above described key pins 46 function to connect the composite nut components 28 and 32 for simultaneous rotation, they are not subjected to the strain of transmitting the load carried by the jack, which load is transmitted by the frusto-spherical surfaces themselves. Thus, the convex frusto-spherical surface 42 of the inner nut component 28 extends sufficiently to provide an upper portion 58 that extends inwardly to face at least partially in a direction parallel to the jack screw axis, and the mating concave frusto-spherical surface 44 of the outer gear component 32 similarly extends sufficiently to form an inwardly extending upper portion 60 that overlaps the upper portion 58 of the inner nut component surface 42, so that axial loads may be transmitted across these overlapping upper surface portions 42 and 44.

In the embodiment illustrated, loads are supported on the load bearing surface 20 of the housing member 18 with the above described overlapping upper surface portions of the composite nut components serving to transmit loads to the jack screw 16. However, in some cases this jack 10 or a modification thereof may be used to support loads applied in the opposite direction. To be able to do this, the convex frusto-spherical surface 42 of the inner nut component 28 extends sufficiently to provide a lower portion 62 that extends inwardly to face at least partially in a downward direction. An annular thrust washer 64 is seated in an annular recess 66 at the bottom of the concave frusto-spherical surface 44 of the outer gear component 32 and has an inner surface 68 extending inwardly as a continuation of the frusto-spherical surface 44 of the outer gear component 32 in overlapping mating relation to the lower surface portion 62 of the inner nut component 28.

The thrust washer 64 is retained in association with the outer gear component 32 by the lower of the pair of bearings 38, which overlaps both the thrust washer 64 and the outer gear component 32. With this construction, loads in either axial direction can be supported by the composite nut structure of the present invention.

The above described thrust washer 64 also facilitates assembly as compared with an integral extension of the outer gear component 32, as the inner nut component 28 can be easily assembled within the outer gear component 32 before the thust washer 64 is seated in place and the bearings 38 placed on the assembly. It should be noted that the bearings 38 do not engage the inner nut component 28 and, therefore, do not interfere with spherical displacement of the inner nut component 28 in the housing member 18. To avoid bearing contact, the inner nut component 28 is relieved, as at 70, adjacent the lower of the pair of bearings 38.

Also to facilitate assembly, the housing member 18 is formed with a removable bottom cap 72 threadably secured thereto and having formed therein the lower of the bearing seats 40.

Depending from the bottom cap 72 is a protective pipe 74 surrounding the extending end of the jack screw 16 and being oversize with respect thereto to permit angular displacement of the screw 16 within the pipe. The bore 76 of the housing member 18 is also oversize with respect to the screw 16 to permit displacement.

Extending upwardly from the top of the housing member 18 is a flexible dust shield boot 78 surrounding the jack screw 16 and having an expandable bellows portion 80 sealed to the jack screw and expandable as the housing member 18 moves downwardly on the jack screw 16 (compare FIGS. 1 and 2).

The jack mechanism described in detail up to this point provides for universal angular displacement of the nut and screw without interference with jack operation, and has many obvious applications where load displacements must be accommodated. However, even greater flexibility may be obtained by combining this structure with the illustrated mounting member 14 so that the jack screw 16 can swivel with respect to the mounting member 14 as well as with respect to the housing member 18 such that the mounting member 14 and housing member 18 may be displaced both angularly and transversely with respect to each other to accommodate side loading, as where the object supported by the jack contracts or expands transversely. For example, a plurality of these jacks may support a single object in an oven with the natural heat expansion requiring lateral displacement by the individual jacks.

This mounting member 14 has a base 82 seated on the overhead support 12 with a central recess 84 through which the end 86 of the jack screw 16 extends, and has a pair of spaced upstanding supports 88 in which the ends of a transverse shaft 90 are supported. The shaft 90 carries a ball bushing 92 that has an inner ring 94 fixed to the shaft 90 and has a spherical outer surface on which is mounted an outer ring 96 with an inner spherical surface for spherical swiveling of the outer ring on the inner ring. Spacer rings 98 are mounted on the transverse shaft 90 on both sides of the ball bushing 92 to maintain the ball bushing in proper spaced relation with respect to the supports 88 of the mounting member base 82 for swivel support of the jack screw end 86, which is apertured at 100 for mounting on the outer ring 96 of the ball bushing 92.

Thus, the ball bushing 92 and transverse shaft 90 permit universal swiveling of the jack screw 16 with respect to the mounting member 14. In addition, the transverse shaft 90 prevents rotation of the jack screw 16 so that no further key means are necessary to lock the screw against rotation.

The mounting member is further provided with an upstanding cylindrical wall 102 enclosing the shaft 90, ball bushing 92 and supports 88, with a cover plate 104 over the top thereof so that the wall 102 and plate 104 protect the elements of the mounting member 14.

The jack mechanism described in detail above and shown in the drawings is designed to provide a universal swivel of approximately 5° in any direction. However, this jack mechanism may be readily redesigned to accommodate swiveling of greater or lesser extent as desired without modifying the features of the present invention.

The above described jack mechanism is only one embodiment of the present invention, and it should be understood that this invention is applicable as well to numerous other types of jack mechanisms, for example, ball screw jacks, and to other types of nut and screw mechanisms in which it is desirable to provide for relative displacement of the elements without restricting the operating relationships. Further, various modifications of the particular structure described may be made within the scope of the present invention.

For example, the transmission of rotation from one nut component to the other may be accomplished by keys cast integrally with one nut component, and with the other nut component formed with longitudinal key receiving slots of sufficient longitudinal extent to receive the keys as the nut components are assembled axially. Alternatively, rotation could be transmitted by mating spherical gear teeth formed in the mating surfaces of the nut components.

Similarly, bevel or spur gears could be substituted for the worm and worm gear of the described embodiment, or other drive means provided, or the nut can be constructed for manual operation.

The present invention has been described in detail above for purposes of illustration only and is not intended to be limited by this description or otherwise except as defined in the appended claims.

I claim:

1. A jack mechanism for suspending loads from an overhead support while accommodating relative displacement of the loads, said jack mechanism comprising a jack mounting mounted on said overhead support and having a transverse shaft and a ball bushing mounted on said shaft, a jack screw depending from said jack mounting and having an end attached to said ball bushing for free universal pivoting with said transverse shaft preventing rotation of said jack screw, a load supporting housing member slidably mounted on said screw and having a load bearing portion for support of a load in spaced relation below said overhead support, an operating nut rotatably mounted in said housing member, said operating nut having an inner nut component threadably mounted on said jack screw with a frusto-spherical outer surface, said operating nut having an outer gear component with an annular peripheral gear surface and an inner frusto-spherical surface mating with said frusto-spherical surface of said inner nut component to permit relative spherical displacement of said components and thereby permit relative spherical displacement of said jack screw with respect to said housing member, said operating nut having key means for drivingly connecting said components for simultaneous rotation, and gear means meshing with said gear surface of said outer gear component for driving said operating nut to move said housing member and supported load vertically on said jack screw.

2. A nut and screw mechanism for converting rotary motion into lineal motion while accommodating relative angular displacement of the nut with respect to the screw, said nut comprising an inner annular component threadably mounted on said screw for effecting relative lineal movement of the screw upon rotation of said inner component and having an outwardly facing convex surface, an outer annular component surrounding said inner component and having a concave inwardly facing surface mating with said convex surface of said inner component for seating of said inner component in said outer component with said mating surfaces providing for relative angular displacement, said convex surface of said inner component having a keyway recess formed therein, said outer component having a key pin receiving hole formed therein and extending transversely therethrough in alignment with said keyway recess of said inner component, and a key pin mounted in said key pin receiving hole and extending into said keyway recess for drivingly connecting said components for simultaneous rotation, said keyway recess being enlarged with respect to said key pin transverse to the direction of rotation to permit relative angular displacement of one component with respect to the other component.

3. A nut and screw mechanism according to claim 2 and characterized further in that a retaining ring is seated around said outer component in covering relation to said key pin receiving hole for retention of said key pin in component connecting position in said hole and keyway recess.

4. A nut and screw mechanism for converting rotary motion into lineal motion while accommodating relative spherical displacement of the nut with respect to the screw, said nut comprising an inner annular component threadably mounted on said screw for effecting relative lineal movement of the screw upon rotation of said inner component and having an outwardly facing frusto-spherical surface, an outer annular component surrounding said inner component and having an inwardly facing frusto-spherical surface mating with said frusto-spherical surface of said inner component for seating of said inner component in said outer component with said mating surfaces providing for relative spherical displacement, said frusto-spherical surface of said inner component having portions facing at least partially in opposite axial directions, said frusto-spherical surface of said outer component extending in mating relation over a major area of the frusto-spherical surface of the inner component including one of said portions, an annular thrust washer associated with said outer component and having an inner surface mating with the other of said portions of said frusto-spherical surface of the inner component, and key means for drivingly connecting said components for simultaneous rotation.

5. A jack mechanism comprising a jack screw, a housing member slidably mounted on said jack screw, an operating nut rotatably mounted in said housing member, said operating nut having an inner nut component threadably mounted on said jack screw with a frusto-spherical outer surface having portions facing at least partially in opposite axial directions, said operating nut having an outer gear component with an annular peripheral gear surface and an inner frusto-spherical surface mating with said frusto-spherical surface of said inner nut component including one of said portions to permit relative spherical displacement of said components and thereby permit relative spherical displacement of said jack screw with respect to said housing member, said outer gear component having an annular recess adjacent the other of said portions, an annular thrust washer mounted in said recess and having an inner surface mating with said other portion of the frusto-spherical surface of the inner nut component, a pair of spaced annular bearing elements mounted in said housing member for rotatably supporting said outer gear component therebetween against spherical displacement with respect to said housing member, one of said annular bearing elements overlapping said thrust washer, said operating nut having key means for drivingly connecting said components for simultaneous rotation, and gear means meshing with said gear surface of said outer gear component for rotating said operating nut to move said jack screw lineally with respect to said housing member.

6. A jack mechanism for suspending loads from an overhead support while accommodating relative displacement of the loads, said jack mechanism comprising a jack screw, a mounting member pivotally mounted on said jack screw and fixed thereto to prevent rotation of said jack screw, a housing member slidably mounted on said jack screw, one of said members being mounted on said overhead support with the jack screw depending therefrom for support of the other of said members therebelow, said other of said members having a load bearing portion for supporting a load by the jack mechanism in spaced relation below said overhead support, an operating nut rotatably mounted in said housing member, said operating nut having an inner nut component threadably mounted on said jack screw with a frusto-spherical outer surface, said operating nut having an outer gear component with an annular peripheral gear surface and an inner frusto-spherical surface mating with said frusto-spherical surface of said inner nut component to permit relative spherical displacement of said components and thereby permit relative spherical displacement of said jack screw with respect to said housing member, said operating nut having key means for drivingly connecting said components for simultaneous rotation, gear means meshing with said gear surface of said outer gear component for driving said operating nut to move said load vertically, said mounting member including a fixed transverse shaft and a ball bushing mounted on said shaft and secured to an end of said jack screw whereby said ball bushing permits free universal pivoting of said jack-screw and said transverse shaft prevents rotation of said jack screw, said universal pivoting permitted by said ball bushing and said spherical displacement permitted by said components of said operating nut combining to accommodate spherical and transverse load displacement.

References Cited in the file of this patent

UNITED STATES PATENTS

| | | |
|---|---|---|
| 733,614 | Ball | July 14, 1903 |
| 1,286,041 | McBride | Nov. 26, 1918 |
| 1,539,642 | Burnside | May 26, 1925 |
| 2,230,534 | Elmer et al. | Feb. 4, 1941 |
| 3,069,924 | Watanabe et al. | Oct. 25, 1962 |